(12) United States Patent
Chye et al.

(10) Patent No.: US 10,950,261 B2
(45) Date of Patent: Mar. 16, 2021

(54) SUPERMALLOY AND MU METAL SIDE AND TOP SHIELDS FOR MAGNETIC READ HEADS

(71) Applicant: Headway Technologies, Inc., Milpitas, CA (US)

(72) Inventors: Yewhee Chye, Hayward, CA (US); Kunliang Zhang, Fremont, CA (US); Min Li, Fremont, CA (US)

(73) Assignee: Headway Technologies, Inc., Milpitas, CA (US)

( * ) Notice: Subject to any disclaimer, the term of this patent is extended or adjusted under 35 U.S.C. 154(b) by 276 days.

(21) Appl. No.: 16/115,115

(22) Filed: Aug. 28, 2018

(65) Prior Publication Data

US 2019/0013041 A1 Jan. 10, 2019

Related U.S. Application Data

(62) Division of application No. 15/283,465, filed on Oct. 3, 2016, now abandoned, which is a division of
(Continued)

(51) Int. Cl.
*G11B 5/39* (2006.01)
*G11B 5/11* (2006.01)
(Continued)

(52) U.S. Cl.
CPC .............. *G11B 5/3912* (2013.01); *G11B 5/11* (2013.01); *G11B 5/112* (2013.01); *G11B 5/115* (2013.01);
(Continued)

(58) Field of Classification Search
CPC ........... G11B 5/11; G11B 5/112; G11B 5/115; G11B 5/3146; G11B 5/315; G11B 5/3163;
(Continued)

(56) References Cited

U.S. PATENT DOCUMENTS 5,053,705 A 10/1991 Herko
6,279,827 B1 8/2001 Yeckley
(Continued)

OTHER PUBLICATIONS

"IEICE Technical Committee Submission System Conference Paper's Information," ken-system: An Areal-Density Capability Study of SMR by using improved Write and Read Heads by Takeo Kagami et al., IEICE Tech. Rep., vol. 111, No. 307, MR2011-21, Intermag 2011, Nov. 18, 2011, 3 pgs.

*Primary Examiner* — Peter Dungba Vo
*Assistant Examiner* — Joshua D Anderson
(74) *Attorney, Agent, or Firm* — Saile Ackerman LLC; Stephen B. Ackerman

(57) ABSTRACT

The use of supermalloy-like materials such as NiFeMe where Me is one or more of Mo, Cr, and Cu for the side and top shields of a magnetic bit sensor is shown to provide better shielding protection from stray fields because of their extremely high permeability. Moreover, the side shield may comprise a stack in which a Ni, Fe, Co, FeNi, CoFe, or FeCo is sandwiched between two NiFeMe layers to enhance the bias field on an adjacent free layer. Including NiFeMe in a side shield results in an increase in readback amplitude under the same asymmetric sigma. For these sensors, the signal to noise ratio was higher and the bit error rate was lower than with conventional materials in the side shield. A method is disclosed for forming a magnetic bit sensor having supermalloy-like materials in the side shields.

4 Claims, 1 Drawing Sheet

Related U.S. Application Data application No. 13/865,269, filed on Apr. 18, 2013, now Pat. No. 9,460,737.

(51) Int. Cl.
*G11B 5/115* (2006.01)
*G11B 5/31* (2006.01)

(52) U.S. Cl.
CPC ............ *G11B 5/3163* (2013.01); *G11B 5/398* (2013.01); *G11B 5/3909* (2013.01); *Y10T 29/49032* (2015.01); *Y10T 428/1171* (2015.01)

(58) Field of Classification Search
CPC ... G11B 5/3909; G11B 5/3912; G11B 5/3932; G11B 5/398; Y10T 29/49032; Y10T 29/49044; Y10T 428/1171
See application file for complete search history.

(56) References Cited

U.S. PATENT DOCUMENTS

| | | |
|---|---|---|
| 6,614,084 B1 | 9/2003 | Cowburn et al. |
| 6,788,502 B1 | 9/2004 | Gill |
| 8,027,116 B2 | 9/2011 | Huang et al. |
| 8,576,518 B1* | 11/2013 | Zeltser .................. G11B 5/398 360/319 |
| 9,230,577 B2 | 1/2016 | Zhang et al. |
| 9,460,737 B2 | 10/2016 | Chye et al. |
| 2003/0227725 A1* | 12/2003 | Macken ............... G01R 33/093 360/324.12 |
| 2011/0051291 A1 | 3/2011 | Miyauchi et al. |

\* cited by examiner

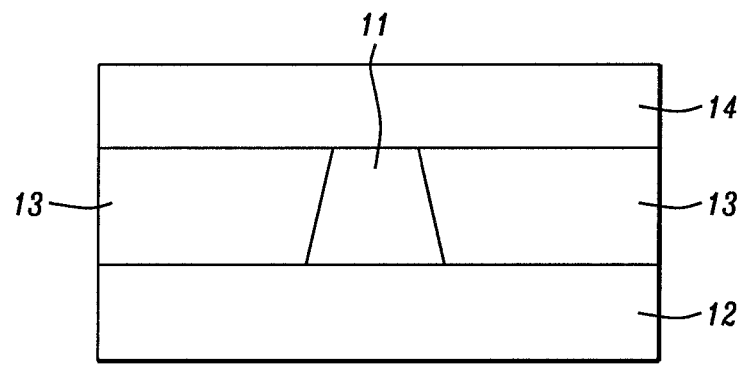
FIG. 1 – Prior Art
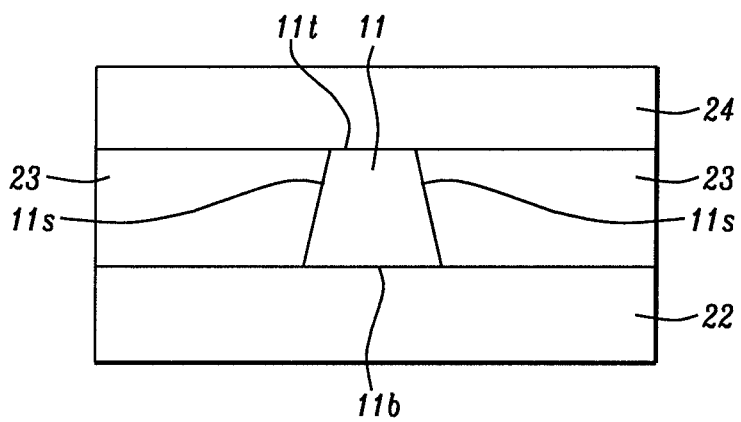
FIG. 2
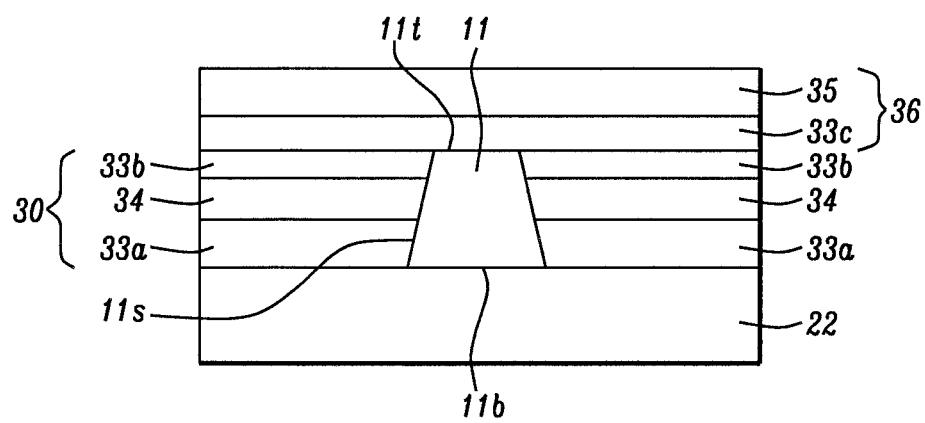
FIG. 3

SUPERMALLOY AND MU METAL SIDE AND TOP SHIELDS FOR MAGNETIC READ HEADS

This is a Divisional application of U.S. patent application Ser. No. 15/283,465, filed on Oct. 3, 2016, which claims priority to U.S. patent application Ser. No. 13/865,269, filed on Apr. 18, 2013, issued as U.S. Pat. No. 9,460,737 on Oct. 4, 2016, which are herein incorporated by reference in their entirety, and assigned to a common assignee.

TECHNICAL FIELD

The information disclosed below relates to the general field of magnetic shields for magnetic bit sensors in which a side shield provides a bias field to an adjacent free layer in the magnetic bit sensor.

BACKGROUND

In order to keep pace with the demands of data storage in today's information technology, the recording density in disk drives has continued to advance. Current hard disk drive technology uses a magnetic tunneling junction (MTJ) in the read head for reading/sensing purposes. A MTJ includes an antiferromagnetic layer, a synthetic antiferromagnetic structure that serves as a reference layer, a magnetic tunneling barrier, and a free magnetic layer that serves as a storage layer.

An MTJ needs to be processed in such a way that the width of the sensor matches the size of the recorded bit stored in the media which is in the scale of nanometers. As a result, the read-back signal will be subject to a significant level of interference from stray fields coming from nearby bits in the media. Additionally, the high reading speed used in today's technology will significantly raise the noise level.

Also, a hard magnetic film is often used to apply a biasing field to the free layer to stabilize its direction of magnetization. This technique is often called hard bias (HB). There are two major approaches in the existing technology for the side shields namely (1) hard magnetic materials as in the hard bias magnets and (2) permalloy NiFe. For the top shield, most designs use permalloy (NiFe).

As the sensor width shrinks into the nanometer range, hard bias designs encounter the following problems:
  (1) The biasing field becomes so strong that movement of the free layer magnetization is constrained. The result of this is that the read back signal has low amplitude.
  (2) The hard magnetic film cannot adequately shield the sensor from bits near to the bit that is being read.

Therefore, a new hard bias design is needed that provides an improved read back signal and better shielding to the sensor structure.

SUMMARY

It has been an object of at least one embodiment of the present disclosure to provide a method for fully shielding a magnetic bit sensor from noise generated by recorded bits other than the magnetic bit that is being sensed.

Another object of at least one embodiment of the present disclosure has been to overcome shielding difficulties associated with the presence of hard bias magnets.

These objects are achieved by providing shields that are made of materials with very high magnetic permeability (mu), or very low coercivity. These high mu shields may be laminated together with other layers that serve different purposes such as providing a means to tune the biasing field for the free layer when laminated with other high moment magnetic layers.

BRIEF DESCRIPTION OF THE DRAWINGS

FIG. 1 is an ABS view of a typical design of a read head with sensor, bottom shield, side shield and top shield according to a process of record practiced by the inventors.

FIG. 2 is an ABS view of a single layer of NiFeMe (Me=Mo, Cr, or Cu) that is used in the side and/or top shield according to an embodiment of the present disclosure.

FIG. 3 is an ABS view of read head with a sensor having a laminated side and/or top shield wherein one or more layers are NiFeMe according to a second embodiment of the present disclosure.

DETAILED DESCRIPTION

FIG. 1 depicts a basic read head structure that was previously fabricated by the inventors, and is used in the art. There is a magnetic bit sensor 11 resting on a lower shield 12, and surrounded by side shield 13 and top shield 14. Today's sensor has become so advanced and complicated that it is almost impossible to predict its performance based on theoretical analysis alone. Sensor performance is very sensitive to the design and to the composition thereof, including that of the side shield and top shield. Therefore, it is desirable to provide additional means for tuning the performance of the side and top shields.

We have discovered that sensors whose side shield structure included a seed layer of NiFeMo(5 wt % Mo)/coupled with $Ni_{81}Fe_{19}$ where 81 and 19 represent the atomic % of Ni and Fe, respectively, showed about a 15% increase in readback amplitude under the same asymmetric sigma or approximately 2-3% lower asymmetric sigma under the same amplitude. For these sensors, the signal to noise ratio was higher and the bit error rate was lower. Laminating the NiFeMo with CoFe in the side shield structure to enhance the magnetic moment showed that the biasing field onto the sensor was also increased. The inclusion of CoFe didn't seem to reduce the advantageous effect of the NiFeMo as the amplitude/asymmetric sigma results showed similar improvement.

As disclosed below, and shown schematically in FIG. 2 according to a first embodiment of the present disclosure, these results suggested the use of a high magnetic permeability alloy with low coercivity (≤1.0 Oe) such as supermalloy or mu alloys of the general form NiFeMe (Me=Mo, Cr, Cu or any combination of these elements) for the bottom shield 22, the side shields 23 and the top shield 24 of magnetic sensor 11. The magnetic sensor has a top side 11t that contacts the top shield, a bottom side 11b that contacts the bottom shield, and two sidewalls 11s which connect the top and bottom sides, and where each sidewall adjoins one of the side shields. As the bit size shrinks into the nanometer range, interference from nearby bits onto the sensor will result in higher level of noise on the read back signal. Therefore, it is necessary to have a good shielding material surrounding the sensor. Conventionally, the bottom and top shields are made of permalloy NiFe and the side shields are made of either the hard magnetic material used for hard bias schemes or permalloy NiFe (FIG. 1).

We have found the use of supermalloy-like materials such as NiFeMe for the side and top shields provides better shielding protection from stray fields because of their extremely high permeability with very low coercivity. Experience has shown this to be a coercivity less than or equal to 1.0 Oe. NiFeMe is made of 3 or more elements whose relative concentrations can be varied easily. As the NiFeMe composition changes, this material will exhibit different magnetic properties including magnetization moment, permeability, coercivity, anisotropy (Hk), and magnetostriction as well as physical properties such as resistivity, thermal conductivity, etc. Any or all these properties can have an impact on the performance of the sensor.

As illustrated in FIG. 3 for a second embodiment wherein the side shield and top shield of FIG. 2 are modified to have a laminated configuration, the single side shield layer 23 may be replaced by a laminated layer 30 that consists of at least one layer of NiFeMe 33a, bias layer 34, and a non-magnetic or magnetic material 33b that may be a second layer of NiFeMe to give a stack from bottom to top having a 33a/34/33b configuration. Moreover, the single top shield layer 24 in FIG. 2 may be modified to have a bilayer stack 36 with a lower non-magnetic or magnetic layer 33c that may be a NiFeMe layer, and an upper hard magnetic layer 35. The advantages of lamination are as follows. Since NiFeMe has a low magnetization moment, adding a magnetic layer 34 that has a higher moment than NiFeMe such as Ni, Co, Fe, FeNi, CoFe, or FeCo will increase the effective moment of the structure, thereby providing a stronger biasing field for the sensor.

Additionally, with lamination, other properties may be changed. When used in the side and top shields, it will have different effects on the sensor and its performance. Also, with proper lamination of NiFeMe with magnetic and non-magnetic layers, the biasing flux from the side shields onto the sensor can be guided and/or enhanced or diluted for the sensor's best performance.

The present disclosure also encompasses a method of making the sensor embodiments disclosed herein. After the sensor profile comprising sidewalls 11s is defined using dry etching techniques that leaves portions of the bottom shield uncovered, an insulating layer (not shown) is deposited for electrical isolation. Thereafter, the side shield of a single NiFeMe layer or laminated NiFeMe layers is deposited using ion beam deposition (IBD) onto the sensor sidewalls and on portions of the bottom shield. Although IBD is generally employed, similar materials can be deposited by other techniques such as plasma vapor deposition (PVD). Other standard process steps were performed subsequently to clean the surface and to etch the top surface before the top shield of single NiFeMe layer or laminated NiFeMe layers is deposited. Similarly, this step can also be performed using other techniques such as PVD.

We claim:

1. A method of forming a magnetic bit sensor, comprising:
   (a) providing a lower magnetic shield and forming on a first portion thereof a magnetic bit sensor that includes sidewalls and a free layer thereby leaving a second portion of the lower magnetic shield uncovered;
   (b) forming a side shield on the magnetic bit sensor sidewalls and on the second portion of the lower magnetic shield that completely covers the sidewalls of the magnetic bit sensor so as to provide a bias field to the free layer, wherein forming the side shield consists of:
      (1) depositing over the second portion of the lower magnetic shield and in contact with the magnetic bit sensor a lower NiFeMe layer where Me is one or more of Mo, Cr, and Cu;
      (2) depositing over the lower NiFeMe layer and in contact with the magnetic bit sensor a middle magnetic layer with a magnetic moment greater than the lower NiFeMe layer; and
      (3) deposited over the middle magnetic layer and in contact with the magnetic bit sensor an upper layer that is a second NiFeMe layer or a non-magnetic layer, the upper layer has a top surface that is a top surface of the side shield; and
   (c) depositing a top shield that fully contacts and covers the magnetic bit sensor and contacts the top surface of the side shield.

2. The method of claim 1 wherein the middle magnetic layer comprises Ni, Co, Fe, FeNi, CoFe, or FeCo to increase an effective moment of the side shield and thereby increase a strength of the bias field.

3. The method of claim 1 wherein the top shield is comprised of a lower NiFeMe layer and an upper magnetic layer.

4. The method of claim 1 wherein both of the top shield and the lower magnetic shield are comprised of NiFeMe.

* * * * *